US008559023B2

(12) United States Patent
Tan et al.

(10) Patent No.: US 8,559,023 B2
(45) Date of Patent: Oct. 15, 2013

(54) MICRO FOCAL-LENGTH COLLIMATION BASED MICRO-CAVITY MEASURING METHOD AND DETECTING EQUIPMENT THEREOF

(75) Inventors: Jiubin Tan, Harbin (CN); Fei Wang, Harbin (CN); Jiwen Cui, Harbin (CN)

(73) Assignee: Harbin Institute of Technology, Heilongjiang (CN)

( * ) Notice: Subject to any disclaimer, the term of this patent is extended or adjusted under 35 U.S.C. 154(b) by 214 days.

(21) Appl. No.: 13/260,464

(22) PCT Filed: Nov. 12, 2009

(86) PCT No.: PCT/CN2009/074909
§ 371 (c)(1),
(2), (4) Date: Sep. 26, 2011

(87) PCT Pub. No.: WO2010/108365
PCT Pub. Date: Sep. 30, 2010

(65) Prior Publication Data
US 2012/0019839 A1   Jan. 26, 2012

(30) Foreign Application Priority Data
Mar. 24, 2009 (CN) .......................... 2009 1 0071623
Mar. 24, 2009 (CN) .......................... 2009 1 0071624

(51) Int. Cl.
*G01B 11/00* (2006.01)
(52) U.S. Cl.
USPC ......... 356/626; 356/241.1; 356/614; 356/121
(58) Field of Classification Search
USPC ................................. 356/626, 121
See application file for complete search history.

(56) References Cited

U.S. PATENT DOCUMENTS

| 4,779,978 A * | 10/1988 | Hatton et al. ................. 356/73.1 |
| 7,023,557 B2 * | 4/2006 | VanWiggeren et al. ...... 356/477 |
| 7,714,991 B1 * | 5/2010 | Barenek et al. .............. 356/73.1 |
| 7,733,477 B2 * | 6/2010 | Tan et al. .................... 356/241.1 |
| 7,783,337 B2 * | 8/2010 | Feldman et al. .............. 600/407 |

FOREIGN PATENT DOCUMENTS

| CN | 1204046 A | 1/1999 |
| CN | 1731084 A | 2/2006 |
| CN | 101520313 A | 9/2009 |
| CN | 101520314 A | 9/2009 |
| WO | 2006128733 A2 | 12/2006 |

OTHER PUBLICATIONS

Written Opinion of the International Search Authority For WO2010108365.
International Search Report For WO2010108365.

* cited by examiner

*Primary Examiner* — Tarifur Chowdhury
*Assistant Examiner* — Isiaka Akanbi
(74) *Attorney, Agent, or Firm* — Ryan A. Schneider, Esq.; Troutman Sanders LLP

(57) ABSTRACT

A micro-cavity measuring method and equipment based on micro focal-length collimation are provided. The equipment can be used to measure irregular micro-cavities and "sub-macro" micro-cavities. Wherein a cylindrical or spherical lens with micro focal-length is combined with a fiber probe (11,12) to form a collimating and imaging optical system of a point light source(8), and the collimating and imaging optical system transforms the two or three dimensional movement of the fiber probe(11,12) into a change in image ultra-highly sensitively. A lot of advantages are obtained, i.e., micro measuring force, high aspect ratio, easy miniaturization, high resolution, simple construction and high speed.

9 Claims, 4 Drawing Sheets

MICRO FOCAL-LENGTH COLLIMATION BASED MICRO-CAVITY MEASURING METHOD AND DETECTING EQUIPMENT THEREOF

CROSS-REFERENCE TO RELATED APPLICATIONS

This application is a US National Stage of International Application No. PCT/CN2009/074909, filed 12 Nov. 2009, which claims the benefit of both CN200910071624.1, filed 24 Mar. 2009 and CN200910071623.7, filed 24 Mar. 2009, each herein fully incorporated by reference.

BACKGROUND OF THE INVENTION

1. Technical Field of the Invention

This invention includes one micro-cavity measuring method and two items of detecting equipment based on micro focal-length collimation, which can be used for measurement of irregular micro-cavities and "sub-macro" micro-cavities in particular, in addition to conventional contact measurement.

2. Technical Background

Miniaturization is one of the most important development trends in many application fields, such as the aviation industry, electronic industry, and medical instruments, etc. Products with micro-cavities features have great importance in applications, such as fuel injector nozzles, inertial instruments, fiber optic ferrules, wire drawing dies, holes in printed circuit boards and medical apparatus, etc. Limited by the micro space and the measuring force, it's difficult to measure micro-cavities with high aspect ratio and high precision. Detectors with slim probes have been designed mainly for measurement of micro-cavities in different kinds of modes. Coordinate measuring mechanisms (CMM) are combined with these detectors to complete the measurement of micro-cavities in aiming and triggering modes. CMM technologies have been developed well to realize precise three-dimensional (three dimensional) movement with nanometer uncertainties, but micro-cavities detectors have not. Most of these detectors have sub-micrometer uncertainties only.

Yang Shimin, Li Shuhe, Han Meimei, et al. have invented a detector for the measurement of holes of 200 μm in diameter with an accuracy of approximately 1 μm. Its probe is modeled as an elastic body so that the deflections of the body can be sensed using capacitance sensors. This method has a nonlinear error of 0.2 μm caused by the detecting process, and its probe is difficult to be miniaturized further. B. J. Kim, T. Masuzawa and T. Bourouina et al. have invented a vibrating-scanning method for measuring micro holes. This method uses a vibrating micro probe that contacts an electrically conducting surface. Upon contact, the circuit closes, thus sending out a signal. The signal is intermittent as the probe is vibrating. The duration of contact with the surface in relation to the time for one amplitude of probe vibration provides an index of proximity of the probe to the surface. Masuzawa refined this technique using a twin probe to measure non-conducting surfaces as well. The vibrating-scanning technology is capable of measuring hole diameter of approximately 125 μm with an accuracy of 0.5 μm. This method has a big drift caused by the vibrated source, and the probe tip shape is rectangle, which causes a blind spot error.

H. Schwenke, F. Wäldele, C. Weiskirch, H. Kunzmann et al. have invented a method of imaging a fiber probe's tip for detecting micro holes. A thin fiber of 15 μm in diameter with a ball of 25 μm in diameter on the end is used as the probe. Light enters through the fiber and is incident on the ball. The back scattered light is imaged using a charge coupled device (CCD) camera. This method has sub-micrometer uncertainties to measure holes of approximately 50 μm in diameter. However, this probe can't detect high aspect ratio holes because of the decrease of the back scattered light.

Tan Jiubin and Cui Jiwen have invented a double fibers coupling method for measurement of micro-cavities. Two fibers are coupled with a ball which is used as the probe ball. Light enters through one fiber and is incident in the ball. Some of the back scattered light is transmit by the other fiber and is imaged by a zoom-in lens group to a CCD camera. This method has solved the problems of detecting high aspect ratio holes and has sub-micrometer uncertainties, but its manufacturing process is so hard to be miniaturized further.

B. Muralikrishnan, J. A. Stone, J. R. Stoup et al. have invented an imaging fiber stem method for measurement of micro holes. A thin fiber of 50 μm in diameter with a ball of 75 μm in diameter on the end is used as the probe. The fiber stem is imaged to be a band shape by two same orthogonal optic systems for two-dimensional (two dimensional) monitoring. The optic system has a magnification of 35. A 4 nm uncertainty was achieved roughly in detecting the position of the probe in space under ideal conditions, and an expanded uncertainty of 0.07 μm (k=2) on diameter was got for nominal diameter of 100 μm holes. The measuring depth reaches to 5 mm. This method is better than others, but its imaging magnification is too low to get a more sensitive and faster detecting signal.

A. Kung, F. Meli and R. Thalmann et al. have invented a touch probe based on a parallel kinematic structure of flexure hinges to minimize the moving mass and ensure an isotropic low stiffness. The feature of this probe head supports exchangeable probes down to 0.1 mm in diameter. A repeatability of 5 nm and an uncertainty of 0.05 μm were achieved. This method has a very complex sensing form, and its probe has a miniaturization problem.

Above all, fiber probes have several applications for measurement of micro-cavities and become more suitable for its optical and mechanical features of optical conductivity, easy miniaturization and tiny measuring force. Different methods have been designed for sensing the movements of the fiber probe, and the followings are some of its drawbacks:

1. The detecting resolutions of the fiber probes are hard to be enhanced further. Most of the fiber probes have sub-micrometer resolutions only. The movement sensitivities of detecting the fiber probes are too low;
2. There is no absolute zero point, which has interferences to the measuring repeatability and judging measuring polarities;
3. The detector is too complex in construction for general applications;
4. The measuring speed is too low to realize a real-time application.

SUMMARY OF THE INVENTION:

One purpose of the present invention is to propose a measuring method based on micro focal-length collimation for measurement of micro-cavities with vertical or tilted planes to overcome the drawbacks of the micro-cavity measuring methods now in use.

According to one aspect of the invention, a micro-cavity measuring method based on micro focal-length collimation is proposed which comprising following steps:

Step 1. providing a fiber probe, which comprising a probe ball, a fiber stem and a collimation lens. A thin glass fiber, cantilevered at one end and with a ball mounted on the other, serves as the probe. The collimation lens is cylindrical or spherical, and its focal length is in micrometers size. The collimation lens is fixed to the middle of the fiber stem;

Step 2. providing a point source to form a collimating and imaging optical system with the collimation lens mentioned in step 1; the image is acquired by an optoelectronic detector; the collimating and imaging optical system is used to transform the movements of the fiber stem into the change in image of the point source;

Step 3. providing a micro-cavity detector, which consists mainly of the fiber probe mentioned in step 1, the point source and the optoelectronic detector mentioned in step 2; the positions of the point source, the fiber probe and the optoelectronic detector are located relatively to form the collimating and imaging optical system mentioned in step 2;

Step 4. Combining the micro-cavity detector mentioned in step 3 with a coordinate measuring machine(CMM), the imaging signal of the optoelectronic detector and the coordinates of the micro-cavity detector are acquired in real time and are processed by a computing program;

Step 5. introducing the probe ball into a micro-cavity work piece and move the micro-cavity detector by CMM until the probe ball touches the micro-cavity work piece; the coordinates of the points touched can be acquired from the computing program mentioned in step 4. The measuring results are generated from the coordinates of the points touched.

Another purpose of the invention is to propose a micro-cavity two dimensional detecting equipment based on micro focal-length collimation for the measurement of micro-cavities.

According to a second aspect the present invention, a micro-cavity two dimensional detecting equipment based on micro focal-length collimation is proposed as shown in FIG. 1. In this drawing, a collimating and imaging optical system of a point source is formed with a parallel light source 8, a spherical lens group 9, a fiber stem 11 and an optoelectronic detector 15. The parallel light source 8 is provided as a light source, the spherical lens group 9 is provided to focus the parallel light of the parallel source 8 for making a point source 10, the fiber stem 11 is provided as a micro cylindrical lens for collimating and imaging the point source 10, and the optoelectronic detector 15 is provided to acquire the image of the point source 10. In order to form the collimating and imaging optical system of a point source easily, adjusting mechanisms are adopted. A four dimensional adjusting mechanism 7 is used to fix the parallel light source 8 and adjust it in two dimensional translation and two dimensional rotation. A five dimensional adjusting mechanism 4 is used to fix the fiber stem 11 and adjust it in three dimensional translation and two dimensional rotation. A fiber probe consists the fiber stem 11 and a probe ball 12. The fiber stem 11 is provided to transfer the movement of the probe ball 12, and the probe ball 12 is provided for touching objects. A platform 1 is used to connect and locate the first connector 2, the second connector 3, the 3rd connector 5, and the 4th connector 6. The first connector 2 is used to connect the four dimensional adjusting mechanism 7, the second connector 3 is used to connect the spherical lens group 9, the 3rd connector 5 is used to connect the five dimensional adjusting mechanism 4 and the 4th connector 6 is used to connect the optoelectronic detector 15. A transmission cable 16 is provided to transmit the imaging signal acquired from the optoelectronic detector 15 to a digital acquiring & processing system 14. The digital acquiring & processing system 14 is provided to acquire and process the imaging signal and output numerical values relative to the movements of the probe ball 12.

The third purpose of the present invention is to propose a micro-cavity three dimensional detecting equipment based on micro focal-length collimation.

According to a third aspect of the invention, a micro-cavity three dimensional detecting equipment based on micro focal-length collimation is proposed as shown in FIG. 2. In this drawing, a collimating and imaging optical system of a point source is formed with a parallel light source 8, a spherical lens group 9, a micro spherical lens 17 and an optoelectronic detector 15. The parallel light source 8 is provided as a light source, the spherical lens group 9 is provided to focus the parallel light of the parallel source 8 for making a point source 10, the micro spherical lens 17 is provided as a micro spherical lens for collimating and imaging the point source 10, and the optoelectronic detector 15 is provided to acquire the image of the point source 10. In order to form the collimating and imaging optical system of a point source easily, adjusting mechanisms are adopted. A four dimensional adjusting mechanism 7 is used to fix the parallel light source 8 and adjust it in two dimensional translation and two dimensional rotation. A five dimensional adjusting mechanism 4 is used to fix a cantilever 18 and adjust it in three dimensional translation and two dimensional rotation. A fiber probe consists the cantilever 18, the fiber stem 11, the micro spherical lens 17 and a probe ball 12. The cantilever 18 is provided to connect the fiber stem 11 to the five dimensional adjusting mechanism 4 and make it have three-dimensional freedom, the fiber stem 11 is provided to transfer the movement of a probe ball 12, the micro spherical lens 17 is provided to transfer the movement of the fiber stem 11, and the probe ball 12 is provided for touching objects. A platform 1 is used to connect and locate the first connector 2, the second connector 3, the 3rd connector 5, and the 4th connector 6. The first connector 2 is used to connect the four dimensional adjusting mechanism 7, the second connector 3 is used to connect the spherical lens group 9, the 3rd connector 5 is used to connect the five dimensional adjusting mechanism 4 and the 4th connector 6 is used to connect the Optoelectronic detector 15. A transmission cable 16 is provided to transmit the imaging signal acquired from the optoelectronic detector 15 to a digital acquiring & processing system 14. The digital acquiring & processing system 14 is provided to acquire and process the imaging signal and output numerical values relative to the movements of the probe ball 12.

The point source 10 can be also acquired by an optical-reflection mechanism as shown in FIG. 3. In this drawing, the parallel light source 8 is provided as a light source, a planar reflector mechanism 20 is used to change the radiative direction of the parallel light of the parallel light source 8, and a concave reflector mechanism 19 is provided to focus the parallel light reflected from the planar reflector mechanism 20 for making the point source 10. This point source 10 can be used in both micro-cavity two dimensional detecting equipment and the micro-cavity three dimensional detecting equipment proposed in the present invention.

The point source 10 can be also acquired by an optical-diffraction mechanism as shown in FIG. 4. In this drawing, the parallel light source 8 is provided as a light source, and a pinhole mechanism 21 is used to diffract the parallel light of the parallel light source 8 for making the point source 10. This point source 10 can be used in both micro-cavity two dimensional detecting equipment and the micro-cavity three dimensional detecting equipment proposed in the present invention.

The micro spherical lens 17 mentioned in the third purpose of the present invention is embedded in the fiber stem 11 as shown in FIG. 5 (a).

The micro spherical lens 17 mentioned in the third purpose of the present invention can also be abutted on said fiber stem 11 as shown in FIG. 5 (b).

The features and advantages of this invention are shown as detailed below:

1. A point source and a collimation lens are used to form a collimating and imaging optical system to sense the movement of the fiber probe. The collimating and imaging optical system achieves an ultrahigh displacement sensitivity up to 10,000 and an ultrahigh resolution up to sub-nanometer;

2. An extremum point exists in every movement direction, which is relative to the eccentricity and the size of the luminance image. The extremum can be used as an absolute zero point in measurement;

3. The two dimensional or three dimensional movement of the fiber stem is acquired effectually in one simple optical system with ultra-high sensitivity and resolution, which leads to an applicable feature of the simple structure of the detecting and measuring system. The two dimensional or three dimensional movement of the fiber stem is transformed into the change in image. The movement of the luminance centroid of the image is relative to the 1D or two dimensional movement of the fiber stem, and the size of the luminance area of the image is relative to the 1D movement of the fiber stem.

4. The two dimensional or three dimensional movement of the fiber stem can be acquired effectually by one line-array optoelectronic detector or one area-array optoelectronic detector, and the ultra-high sensitivity of this method simplifies the calculating process of the measurement signal with high resolution. These features lead to an applicable feature of high speed sampling and real time measuring.

Above all, this invention has not only the features of fiber probes such as micro measuring force, easy miniaturization, and high measuring aspect ratio, but also has the features of higher detecting resolution, extremum point in measuring directions, higher measuring speed and simple system structure. The detecting resolution can reach to sub-nanometer and more, the probe ball can be made into 40 μm in diameter, and the measuring depth can reach to 5 mm and more.

BRIEF DESCRIPTION OF THE DRAWINGS

Figure 1:
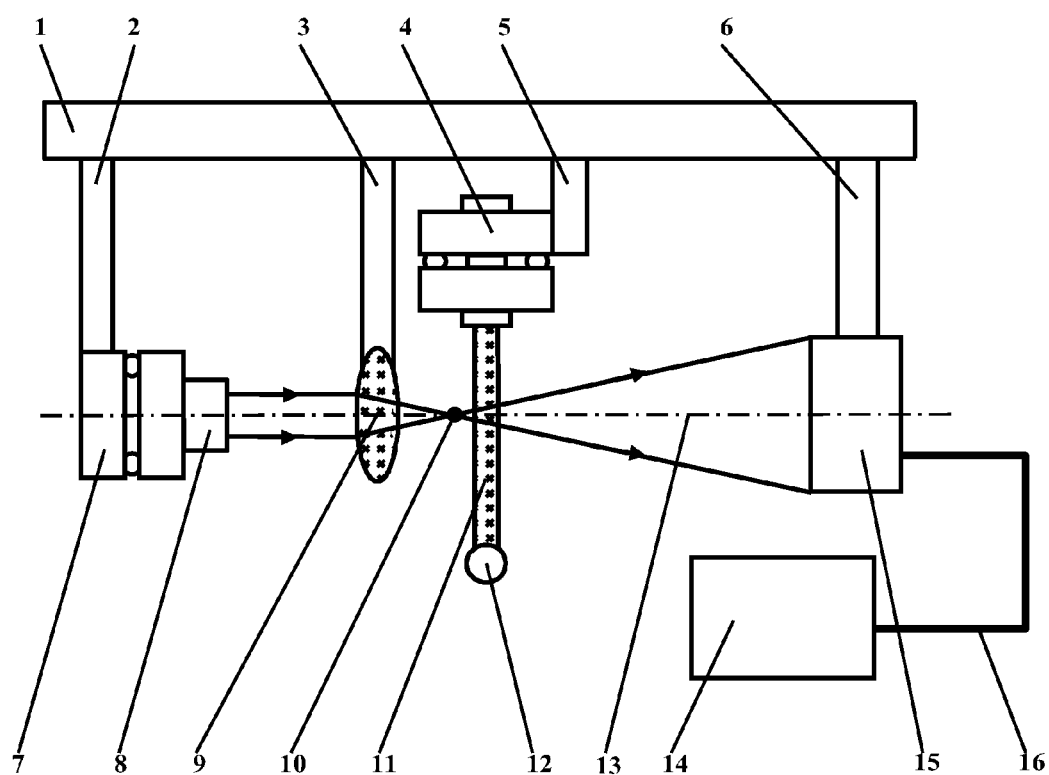
Figure 2:
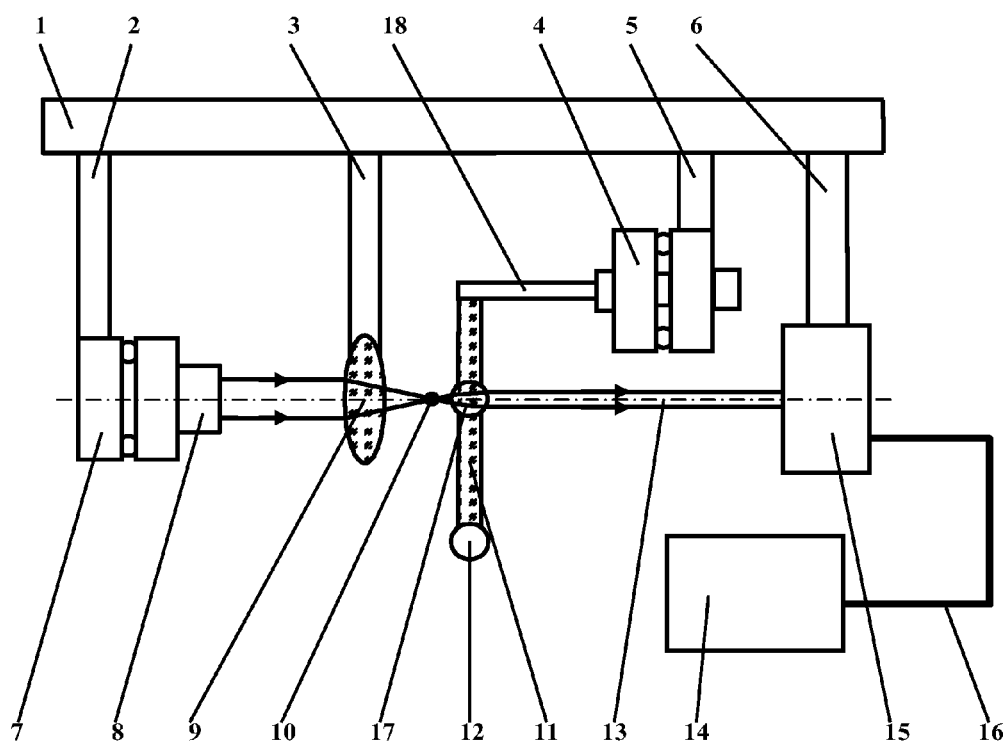
Figure 3:
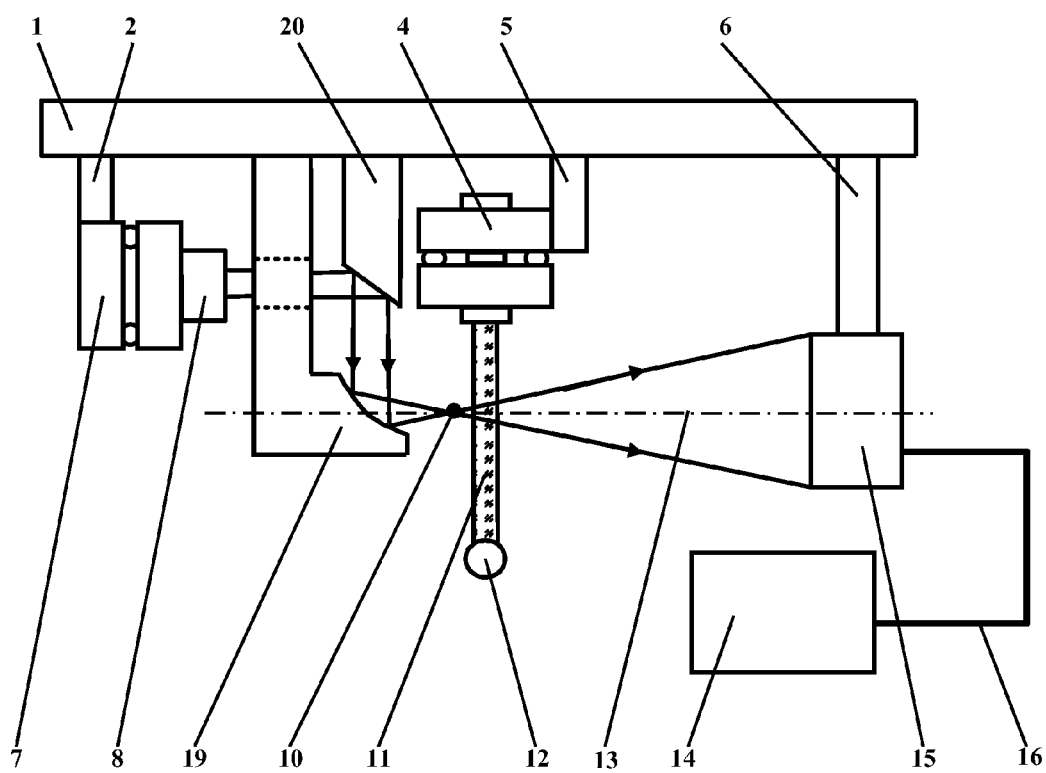
Figure 4:
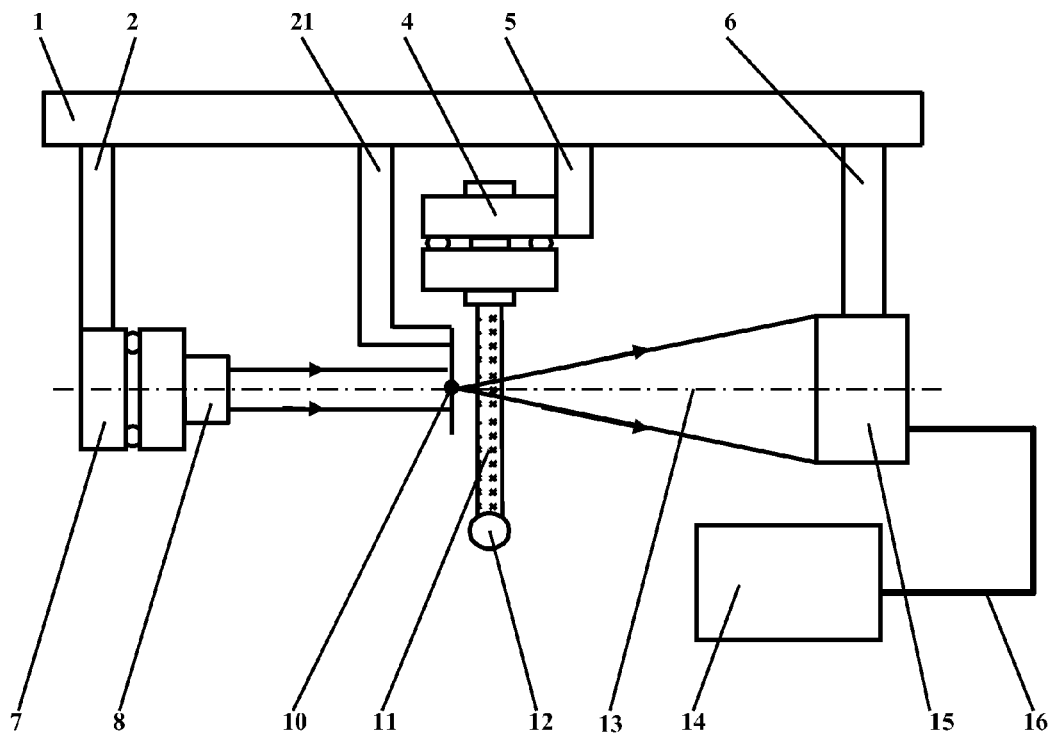
Figure 5:
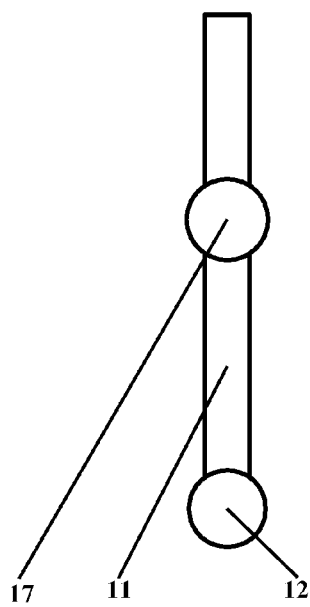
Figure 5:
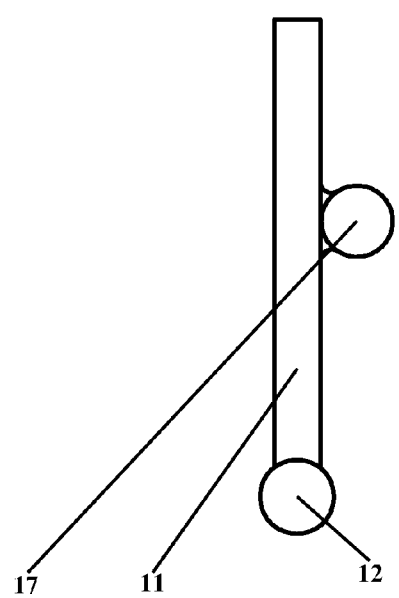

IN THE DRAWINGS,

FIG. 1: construction of micro-cavity two dimensional detecting equipment based on micro focal-length collimation;

FIG. 2: construction of micro-cavity three dimensional detecting equipment based on micro focal-length collimation;

FIG. 3: block diagram of point source acquirement based on catoptrics;

FIG. 4: block diagram of point source acquirement based on pinhole diffraction optics;

FIG. 5(*a*): embedment construction of fiber probe;

FIG. 5(*b*): abutment construction of fiber probe.

As shown in FIGS. 1-5, the detecting equipment consists of platform(1), first connector(2), second connector(3), five dimensional adjusting mechanism(4), 3rd connector(5), 4th connector(6), four dimensional adjusting mechanism (7), parallel light source(8), spherical lens group(9), point source (10), fiber stem(11), probe ball(12), optical axis of collimating and imaging optical system (13), digital acquiring & processing system(14), optoelectronic detector (15), digital transmission cable(16), micro spherical lens(17), cantilever (18), concave reflector mechanism (19), planar reflector mechanism(20), pin-hole mechanism(21).

PREFFERED EMBODIMENTS OF THE INVENTION

A micro-cavity measuring method based on micro focal-length collimation includes the following steps:

Step 1. providing a fiber probe, which comprising a probe ball, a fiber stem and a collimation lens. A thin glass fiber, cantilevered at one end and with a ball mounted on the other, serves as the probe. The collimation lens is cylindrical or spherical, and its focal length is in micrometers size. The collimation lens is fixed to the middle of the fiber stem;

In step 1, the collimation lens means its focal length is in micrometers size, and it is hard to make an ideal one. However, a nonideal one is tolerable. Part of the fiber stem or a micro crystal ball can be used as a lens with micro focal-length. The focal length of the lens can be calculated approximately using the following:

$$f \approx \frac{r \times n_1}{2 \times (n_1 - 1)} \quad (1)$$

where, f is the focal length of the lens, r is the radius of the fiber stem or the crystal ball, $n_1$ is the refractive index of the fiber stem or the crystal ball, and the refractive index of air is 1. r is in the scope of 10 μm to 100 μm, and $n_1$ is in the scope of 1.4 to 1.6. Thus, f is in the scope of 13.33μm to 133.33 μm according to formula (1).

Step 2. providing a point source to form a collimating and imaging optical system with the collimation lens mentioned in step 1; the image is acquired by a charge-coupled device (CCD) camera; the collimating and imaging optical system is used to transform the movements of the fiber stem into the change in image of the point source;

In step 2, the point source can be acquired through three ways. The first way is based on optical refraction theory, in which a spherical lens group is combined with a parallel light source to get a point source. The second way is based on optical reflection theory, in which a concave reflector is combined with a parallel light source in order to get a point source. The third way is based on optical diffraction theory, in which a pinhole is combined with a parallel light source to get a point source.

When the point source is placed near the focus of the collimation lens mentioned in step 1, a collimation optical system is formed, and the beam of the point source will be collimated and imaged to the CCD camera. The image will change relatively to the movement of the fiber stem. The image changes in two ways, which are corresponding to the two kinds of movement of the fiber stem.

The first way of the change in image is the movement of the luminance centroid of the image. This movement is corresponding to the movement of the fiber stem in the direction vertical to the optical axis of the collimation optical system, and the sensitivity can be calculated approximately using formula (2):

$$\beta = l'/f \quad (2)$$

where, β is the movement sensitivity of the collimation optical system, l' is the imaging distance, and f is the focal length of the collimation lens. β can reach approximately 7500, when l' is 100 mm and f is 13.33 μm.

The second way of the change in image is the luminance size of the image, which corresponds to the movement of the fiber stem in the direction of the optical axis of the collimation optical system, and the sensitivity can be calculated approximately using formula (3):

$$\alpha = 2 \times \tan\theta \times (l'/f - 1) \qquad (3)$$

where, α is the movement sensitivity of the collimation optical system, θ is the divergence angle of the beam of the point source, l' is the imaging distance, and f is the focal length of the collimation lens. α can reach approximately 15000, when θ is 45°, l' is 100 mm and f is 13.33 µm.

The eccentricity of the imaging luminance changes relatively to the movement of the fiber stem in the direction vertical to the optical axis of the collimation optical system. The eccentricity has a extremum where the eccentricity is zero. On the other hand, the size of the image has a extremum too where the image size is the smallest. Thus, a extremum point exists in every detecting direction, which is helpful to the measurement.

Step 3. providing a micro-cavity detector, which consists mainly of the fiber probe mentioned in step 1, the point source and the CCD camera mentioned in step 2; the positions of the point source, the fiber probe and the CCD camera are located relatively to form the collimating and imaging optical system mentioned in step 2;

In step 3, a micro-cavity detector is formed, which has simple construction, two dimensional or three dimensional detecting capability and ultra-high sensitivity. The output signal of CCD camera is easy to calculate with high resolution cause of the ultra-high movement sensitivity, and the coupling interference of the output signal is little in each detecting direction. These features lead to an easy application for micro-cavity two dimensional or three dimensional measurement with high speed, high resolution and high aspect ratio.

Step 4. Combining the micro-cavity detector mentioned in step 3 with a coordinate measuring machine(CMM), the imaging signal of the CCD camera and the coordinates of the micro-cavity detector are acquired in real time and are processed by a computing program;

In step 4, a trigger type of micro-cavity measurement method is formed, in which the coordinates and the change in image will be recorded with high speed in real time. The micro-cavity detector is used as a trigger and the CMM offers a precise three dimensional movement. The movement of CMM will be stopped as soon as the probe ball touches the object micro cavity.

Step 5. introducing the probe ball into a micro-cavity work piece and move the micro-cavity detector by CMM until the probe ball touches the micro-cavity work piece; the coordinates of the points touched can be acquired from the computing program mentioned in step 4. The measuring results are generated from the coordinates of the points touched.

In step 5, the coordinates of object points are acquired using the trigger type of micro-cavity measurement method mentioned in step 4. When the probe ball touches a micro-cavity object, the change in image happens, and the coordinates will be found out in the exact first touching time according to the change in image. Thus, the coordinates of the detecting points can be acquired easily and quickly. Then, the dimensions of the object micro cavity can be calculated according to the coordinates of the detecting points.

According to the second purpose of the present invention, a micro-cavity two dimensional detecting equipment based on micro focal-length collimation can be set up in the following ways:

As shown in FIG. 1, a He—Ne laser of 15 mW in power can be used as the parallel light source 8, whose output light is collimated. Generally, gas laser has more stable light beam than semiconductor laser, which means the light beam has less angle drift and more stable output power. The wavelength of the gas laser is adopted according to the characters of the optoelectronic detector 15. An object lens of 150 in magnification and 0.95 in numerical aperture (NA) can be used as the spherical lens group 9 to focus the parallel light of the He-Ne laser for making a point source 10. Because we want the collimating and imaging optical system has a ultrahigh displacement sensitivity, it is better to get a smaller size in space of the point source. A part of single-mode optical fiber can be used as the fiber stem 11, which can be made slimmer by drawing and eroding method. A line-array CCD camera can be used as the optoelectronic detector 15, which can sample the image of the point source 10 fast and effectively. In order to form the collimating and imaging optical system of a point source easily, adjusting mechanisms are adopted. A four dimensional adjusting mechanism 7 is used to fix the parallel light source 8 and adjust it in two dimensional translation and two dimensional rotation. A five dimensional adjusting mechanism 4 is used to fix the fiber stem 11 and adjust it in three dimensional translation and two dimensional rotation. A fiber probe consists the fiber stem 11 and a probe ball 12. The probe ball 12 can be made by melting an end of the fiber stem, and the ball shape can be fashioned under the process of the surface tension of the melted fiber. The fiber stem 11 is provided to transfer the movement of the probe ball 12, and the probe ball 12 is provided for touching objects. A platform 1 is used to connect and locate the first connector 2, the second connector 3, the 3rd connector 5, and the 4th connector 6. The first connector 2 is used to connect the four dimensional adjusting mechanism 7, the second connector 3 is used to connect the spherical lens group 9, the 3rd connector 5 is used to connect the five dimensional adjusting mechanism 4 and the 4th connector 6 is used to connect the Optoelectronic detector 15. A transmission cable 16 is provided to transmit the imaging signal acquired from the Optoelectronic detector 15 to a digital acquiring & processing system 14. The digital acquiring & processing system 14 can be a general computer, which is provided to acquire and process the imaging signal and output numerical values relative to the movements of the probe ball 12.

According to the third purpose of the present invention, a micro-cavity three dimensional detecting equipment based on micro focal-length collimation can be set up in the following ways:

As shown in FIG. 2, a He—Ne laser of 15 mW in power can be used as the parallel light source 8, whose output light is collimated. Generally, gas laser has more stable light beam than semiconductor laser, which means the light beam has less angle drift and more stable output power. The wavelength and the output power of the gas laser is adopted according to the characters of the Optoelectronic detector 15. An object lens of 150 in magnification and 0.95 in numerical aperture (NA) can be used as the spherical lens group 9 to focus the parallel light of the He—Ne laser for making a point source 10. Because we want the collimating and imaging optical system has a ultrahigh displacement sensitivity, it is better to get a smaller size in space of the point source. A micro spherical lens 17 can be a micro optical ball made by abrasive method. An area-array CCD camera can be used as the Optoelectronic detector 15, which can sample the image of the point source 10 effectively. In order to form the collimating and imaging optical system of a point source easily, adjusting mechanisms are adopted. A four dimensional adjusting mechanism 7 is used to fix the parallel light source 8 and adjust it in two dimensional translation and two dimensional rotation. A five dimensional adjusting mechanism 4 is used to fix the cantilever 18 and adjust it in three dimensional translation and two dimensional rotation. A fiber probe consists the cantilever 18, the fiber stem 11, the micro spherical lens 17 and a probe ball 12. The cantilever 18 is provided to connect the fiber stem 11 to the five dimensional adjusting mechanism 4 and make it have three-dimensional freedom, the fiber stem 11 is provided to transfer the movement of a probe ball 12, the micro spherical lens 17 is provided to transfer the movement of the fiber stem 11, and the probe ball 12 is provided for touching objects. The probe ball 12 can be made by melting an end of the fiber stem, and the ball shape can be fashioned under the process of the surface tension of the melted fiber. A platform 1 is used to connect and locate the first connector 2, the second connector 3, the 3rd connector 5, and the 4th connector 6. The first connector 2 is used to connect the four dimensional adjusting mechanism 7, the second connector 3 is used to connect the spherical lens group 9, the 3rd connector 5 is used to connect the five dimensional adjusting mechanism 4 and the 4th connector 6 is used to connect the Optoelectronic detector 15. A transmission cable 16 is provided to transmit the imaging signal acquired from the Optoelectronic detector 15 to a digital acquiring & processing system 14. The digital acquiring & processing system 14 can be a general computer, which is provided to acquire and process the imaging signal and output numerical values relative to the movements of the probe ball 12.

The point source 10 can be also acquired by an optical-reflection mechanism as shown in FIG. 3. In this drawing, the parallel light source 8 is provided as a light source, a planar reflector mechanism 20 is used to change the radiative direction of the parallel light of the parallel light source 8, and a concave reflector mechanism 19 is provided to focus the parallel light reflected from the planar reflector mechanism 20 for making the point source 10. This point source 10 can be used in both micro-cavity two dimensional detecting equipment and the micro-cavity three dimensional detecting equipment proposed in the present invention.

The point source 10 can be also acquired by an optical-diffraction mechanism as shown in FIG. 4. In this drawing, the parallel light source 8 is provided as a light source, and a pinhole mechanism 21 is used to diffract the parallel light of the parallel light source 8 for making the point source 10. This point source 10 can be used in both micro-cavity two dimensional detecting equipment and the micro-cavity three dimensional detecting equipment proposed in the present invention.

The micro spherical lens 17 mentioned in the third purpose of the present invention is embedded in the fiber stem 11 as shown in FIG. 5 (a).

The micro spherical lens 17 mentioned in the third purpose of the present invention can also be abutted on said fiber stem 11 as shown in FIG. 5 (b).

What is claimed is:

1. A micro-cavity measuring method based on micro focal-length collimation comprising:
    providing a micro-cavity detector comprising:
        a fiber probe comprising a probe ball, a fiber stem cantilevered at one end and with the probe ball mounted on the other end, and a collimation lens that is cylindrical or spherical and fixed to the middle of the fiber stem, the collimation lens having a micro focal length;
        a point source; and
        an optoelectronic detector that acquires images of the point source;
    wherein the positions of the point source, the fiber probe and the optoelectronic detector are located relatively to define a collimating and imaging optical system that transforms movements of the fiber stem into changes in the images acquired by the optoelectronic detector;
    using the optoelectronic detector to acquire images of the point source;
    introducing the probe ball into a micro-cavity work piece and moving the micro-cavity detector using a coordinate measuring machine (CMM) until the probe ball touches the micro-cavity work piece;
    acquiring coordinates of the points touched by the probe ball; and
    generating measuring results using the coordinates;
    wherein the images of the point source and the coordinates are acquired in real time and are processed by a computer program.

2. Micro-cavity two dimensional detecting equipment based on micro focal-length collimation, comprising:
    a collimating and imaging optical system of a point source having:
        a parallel light source provided as a light source;
        a spherical lens group provided to focus the parallel light of the parallel light source to form a point source;
        a fiber probe having a fiber stem provided as a micro cylindrical lens for collimating and imaging the point source and for transferring the movement of a probe ball providing for touching objects; and
        an optoelectronic detector provided to acquire the image of the point source;
    a four dimensional adjusting mechanism for fixing the parallel light source and adjusting it in two dimensional translation and two dimensional rotation;
    a five dimensional adjusting mechanism for fixing the fiber stem and adjusting it in three dimensional translation and two dimensional rotation;
    a platform;
    a first connector for connecting and locating the four dimensional adjusting mechanism to the platform;
    a second connector for connecting and locating the spherical lens group to the platform;
    a third connector for connecting and locating the five dimensional adjusting mechanism to the platform;
    a fourth connector for connecting and locating the optoelectronic detector to the platform; and
    a transmission cable provided to transmit an imaging signal acquired from the optoelectronic detector to a digital acquiring and processing system, wherein the digital and processing system is provided to acquire and process the imaging signal and output numerical values relative to the movements of said probe ball.

3. Micro-cavity three dimensional detecting equipment according to claim 2, wherein the collimating and imaging optical system of a point source further comprises an optical-reflection mechanism including:
    a planar reflector mechanism for changing the radiative direction of the parallel light provided by the parallel light source; and
    a concave reflector mechanism provided to focus the parallel light reflected from the planar reflector mechanism to form the point source.

4. Micro-cavity three dimensional detecting equipment according to claim 2, wherein the collimating and imaging optical system further comprises an optical-diffraction mechanism including a pinhole mechanism for diffracting the parallel light provided by the parallel light source to form the point source.

5. Micro-cavity three dimensional detecting equipment based on micro focal-length collimation, comprising:
- a collimating and imaging optical system of a point source having:
  - a parallel light source provided as a light source;
  - a spherical lens group provided to focus the parallel light of the parallel light source to form a point source;
  - a micro spherical lens provided to collimate and image the point source; and
  - an optoelectronic detector provided to acquire the image of the point source;
- a four dimensional adjusting mechanism for fixing the parallel light source and adjusting it in two dimensional translation and two dimensional rotation;
- a five dimensional adjusting mechanism for fixing a cantilever and adjusting it in three dimensional translation and two dimensional rotation;
- a fiber probe comprising the cantilever provided to connect a fiber stem to the five dimensional adjusting mechanism and make it have three-dimensional freedom, the fiber stem being provided to transfer the movement of a probe ball for touching objects and the micro spherical lens being provided to transfer the movement of the fiber stem;
- a platform;
- a first connector for connecting and locating the four dimensional adjusting mechanism to the platform;
- a second connector for connecting and locating the spherical lens group to the platform;
- a third connector for connecting and locating the five dimensional adjusting mechanism to the platform;
- a fourth connector for connecting and locating the optoelectronic detector to the platform;
- a transmission cable provided to transmit an imaging signal acquired from the optoelectronic detector to a digital acquiring and processing system wherein the digital acquiring and processing system is provided to acquire and process the imaging signal and output numerical values relative to the movements of the probe ball.

6. Micro-cavity three dimensional detecting equipment according to claim 5, wherein the collimating and imaging optical system of a point source further comprises an optical-reflection mechanism including:
- a planar reflector mechanism for changing the radiative direction of the parallel light provided by the parallel light source; and
- a concave reflector mechanism provided to focus the parallel light reflected from the planar reflector mechanism to form the point source.

7. Micro-cavity three dimensional detecting equipment according to claim 5, wherein the collimating and imaging optical system further comprises an optical-diffraction mechanism including a pinhole mechanism for diffracting the parallel light provided by the parallel light source to form the point source.

8. Micro-cavity three dimensional detecting equipment according to claim 5, wherein the micro spherical lens is embedded in the fiber stem.

9. Micro-cavity three dimensional detecting equipment according to claim 5, wherein the micro spherical lens is mounted on the fiber stem.

* * * * *